United States Patent [19]
Rutzen et al.
[11] Patent Number: 4,923,642
[45] Date of Patent: May 8, 1990

[54] QUATERNARY AMMONIUM COMPOUNDS, THEIR PRODUCTION AND USE IN FABRIC AFTERTREATMENT PREPARATIONS

[75] Inventors: Horst Rutzen, Langenfeld; Horst Baumann, Leichlingen; Bert Gruber, Bedburg, all of Fed. Rep. of Germany

[73] Assignee: Henkel Kommanditgesellschaft auf Aktien, Duesseldorf, Fed. Rep. of Germany

[21] Appl. No.: 121,267

[22] Filed: Nov. 16, 1987

[30] Foreign Application Priority Data

Nov. 14, 1986 [DE] Fed. Rep. of Germany ....... 3638918

[51] Int. Cl.[5] ............................................... C09F 5/00

[52] U.S. Cl. ................................ 260/404; 260/404.5; 260/410.6; 560/183; 560/186; 564/159; 564/203

[58] Field of Search .................. 260/404, 404.5, 410.6; 560/183, 186; 564/159, 203

[56] References Cited

U.S. PATENT DOCUMENTS

| | | | |
|---|---|---|---|
| 3,873,583 | 3/1975 | Walz et al. | 260/404 |
| 4,137,180 | 1/1979 | Naik et al. | 260/404 |
| 4,339,391 | 7/1982 | Hoffmann et al. | 260/404 |
| 4,675,131 | 6/1987 | Walraevens et al. | 260/404 |

FOREIGN PATENT DOCUMENTS

| | | |
|---|---|---|
| 1619058 | 1/1971 | Fed. Rep. of Germany . |
| 3402146 | 7/1985 | Fed. Rep. of Germany . |

*Primary Examiner*—Bruce D. Gray
*Attorney, Agent, or Firm*—Ernest G. Szoke; Wayne C. Jaeschke; Real J. Grandmaison

[57] ABSTRACT

Quaternary ammonium compounds containing one or two long-chain ester or amide radicals of etherified hydroxycarboxylic acids and, for the remainder, short-chain radicals, which are liquid to pasty substances that may readily be dissolved or dispersed in water or alcohol/water mixtures. They may be used in dilute or concentrated, storable form for softening fabrics without the absorbency of the treated fabrics being adversely affected. The quaternary ammonium compounds are obtained by reaction of epoxyfatty acid esters with amines and subsequent quaternization.

11 Claims, No Drawings

QUATERNARY AMMONIUM COMPOUNDS, THEIR PRODUCTION AND USE IN FABRIC AFTERTREATMENT PREPARATIONS

BACKGROUND OF THE INVENTION

1. Field of the Invention

This invention relates to quaternary ammonium compounds in which the ammonium nitrogen atom carries one or two long-chain ester groups or amide groups of etherified hydroxycarboxylic acids, to a process for the production of these quaternary ammonium compounds, and to their use in fabric aftertreatment preparations.

Quaternary ammonium compounds containing one or two long-chain and three or two short-chain aliphatic hydrocarbon radicals in the molecule, such as for example the compound distearyldimethylammonium chloride, have long been used as fabric softeners for the treatment of fabrics, more especially for the aftertreatment of washed laundry, but also in softening detergents and in tumbler aids. By treatment with compounds of this type, the fabrics, drying-up cloths or diapers, which have been repeatedly treated with quaternary ammonium compounds of the type in question after washing, show impaired service properties on account of their reduced or retarded water absorption capacity. These unfavorable effects are attributable to the fact that the quaternary ammonium compounds applied to the fibers are not removed or are not completely removed during the subsequent washing process, so that repeated aftertreatment results in an accumulation of the quaternary ammonium compounds on the fibers of the fabrics.

2. Discussion of Related Art

Through various measures which have been mainly concerned with increasing the hydrophilicity of the softening compounds, attempts have been made to reduce or completely eliminate the above-mentioned disadvantages of known fabric softeners. For example, hydroxyl groups have been introduced into one or more of the long-chain or short-chain groups of the quaternary compounds or the long-chain groups used have been those wherein the hydrocarbon is interrupted, for example, by ether, amide or ester groups. Thus, German Patent Appplication 16 19 058 for example describes quaternary ammonium compounds derived from methyl diethanolamine wherein the ethanol groups are esterified with saturated or unsaturated monocarboxylic acids. European Patent Application 21 431 describes quaternary ammonium compounds wherein the hydrocarbon chains contain ester, ether, ethoxy or propoxy groups.

German Patent Application 34 02 146 relates to quaternary ammonium compounds containing one or two long-chain ester groups wherein the acid component is derived from branched carboxylic acids of the so-called "Guerbet" type.

Although the quaternary ammonium compounds known from German Patent Application 34 02 146 have few, if any, of the above-described disadvantages, they can only be produced in several complicated process steps or accumulate during their production in the form of dilute dispersions which cannot be used for the production of the fabric softener concentrates in which increasing interest has been shown in recent years. In addition, they are attended by the disadvantages that they are difficult to dissolve or disperse in aqueous systems or show a tendency towards hydrolysis therein. Those compounds which contain ester bonds are particularly affected by this disadvantage.

An object of the present invention is to provide raw materials for fabric aftertreatment preparations which do not have the disadvantages of the prior art. The invention seeks to provide raw materials for fabric aftertreatment preparations which, in addition to good solubility in aqueous preparations which, in addition to good solubility in aqueous systems, are also suitable for blending into concentrates for fabric aftertreatment preparations. In view of the high demand for concentrates such as these, the so-called "ten-fold concentrates" are of particular interest. In addition, the raw materials for fabric aftertreatment preparations are also intended to bring with them the property of not affecting the absorbency of the treated fabrics, so that the treated fabrics fully retain their absorbency even after repeated washing and aftertreatment. So far as the production of the raw materials for fabric aftertreatment preparations is concerned, the invention seeks to use only those raw materials which are available from natural sources and hence are capable of regeneration.

DESCRIPTION OF THE INVENTION

Other than in the operating examples, or where otherwise indicated, all numbers of expressing quantitites of ingredients or reaction conditions used herein are to be understood as modified in all instances by the term "about".

According to the invention, the above-stated objects may surprisingly be achieved by esterification or amidation of suitable aminoalchohols or oligoamines with particular carboxylic acids and quaternization of the resulting esters or amides in a known manner. The carboxylic acids used comprise hydroxyether carboxylic acids which may be obtained from unsaturated fatty acid esters by epoxidation and subsequent ring opening with saturated or unsaturated alcohols or polyols. Surprisingly, the products formed in the course of this reaction chain satisfy all the above-mentioned requirements.

Accordingly, the present invention relates to quaternary ammonium compounds corresponding to the following general formula

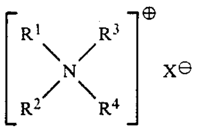

(I)

wherein $R^1$ is a $C_1$–$C_4$ alkyl radical or a $C_1$–$C_4$ hydroxyalkyl radical, $R^2$ is a $C_1$–$C_4$ alkyl radical, a $C_1$–$C_4$ hydroxyalkyl radical or a phenalkyl radical containing from 1 to 3 carbon atoms in the alkyl group, and $R^3$ and $R^4$ may be the same or different and represent a radical corresponding to the following general formula

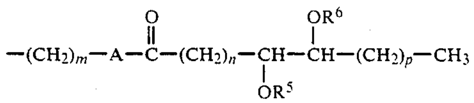

(II)

in which m is an integer of from 1 to 3, n and p independently of one another are integers of from 1 to 12 with a sum (p+n) of from 2 to 20, A is a group —O— or —NH—, and $R^5$ and $R^6$ are hydrogen or a saturated or unsaturated $C_1$-$C_{22}$ alkyl radical, with the proviso that $R^5$ is H when $R^6$ is an alkyl radical and vice versa, and $X^{\ominus}$ is the anion of an inorganic or organic acid.

In addition, the invention also relates to a process for the production of quaternary ammonium compounds corresponding to the following general formula

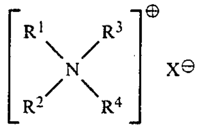

(I)

wherein $R^1$ is a $C_1$-$C_4$ alkyl radical or a $C_1$-$C_4$ hydroxyalkyl radical, $R^2$ is a $C_1$-$C_4$ alkyl radical, a $C_1$-$C_4$ hydroxyalkyl radical or a phenalkyl radical containing from 1 to 3 carbon atoms in the alkyl group, and $R^3$ and $R^4$ may be the same or different and represent a radical corresponding to the following general formula

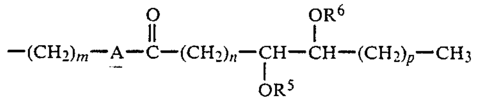

(II)

in which m is an integer of from 1 to 3, n and p independently of one another are integers of from 1 to 12 with a sum (p+n) of from 2 to 20, A is a group —O— or —NH—, and $R^5$ and $R^6$ are hydrogen or a saturated or unsaturated $C_1$-$C_{22}$ alkyl radical, with the proviso that $R^5$ is H when $R^6$ is an alkyl radical and vice versa, and $X^{\ominus}$ is the anion of an inorganic or organic acid, characterized in that epoxy fatty acid esters corresponding to the following general formula

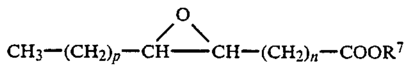

(III)

in which $R^7$ is a $C_1$-$C_6$ alkyl radical, and n and p are as defined above, are reacted in known manner with an alcohol corresponding to the following general formula $R^5$—OH (IV)

in which $R^5$ is a saturated or unsaturated $C_1$-$C_{22}$ alkyl radical, and the esters obtained are hydrolyzed, the hydroxyether carboxylic acids thus formed are reacted at elevated temperature with an amine corresponding to the following general formula

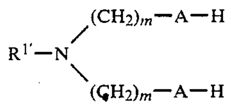

(V)

in which $R^{1'}$ may be hydrogen or may have the meanings defined above for $R^1$, and A and m may have the meanings defined above, in a molar ratio of from 1:1 to 3.5:1 and, when $R^1$ is H, the products are subsequently alkoxylated with ethylene oxide or propylene oxide in an approximate molar ratio of 1:1, the compounds thus formed are reacted in known manner at elevated temperature with a quaternizing reagent corresponding to the following general formula $R^2X$ (VI)

in which $R^2$ and X are as defined above, in the presence or absence of a solvent and, if desired, the resulting quaternary ammonium compounds corresponding to general formula (I) are isolated from the solution by methods known per se.

The present invention also relates to the process of using the quaternary ammonium compounds corresponding to general formula (I) above in fabric aftertreatment preparations for synthetic and natural fibers and materials produced therefrom.

The new quaternary ammonium compounds which have special properties that make them suitable as raw materials for fabric aftertreatment preparations have the following general formula

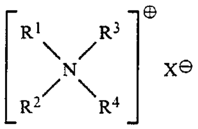

(I)

In general formula (I), the substituent $R^1$ attached to the ammonium nitrogen atom in the quaternary ammonium compounds according to the invention may be a $C_1$-$C_4$ alkyl radical or a $C_1$-$C_4$ hydroxyalkyl radical. Accordingly, suitable $R^1$ substituents include the methyl, ethyl, n-propyl, i-propyl, n-butyl, i-butyl, t-butyl, and hydroxymethyl, hydroxyethyl, hydroxypropyl or hydroxybutyl groups. Among these groups, the $C_1$-$C_4$ hydroxyalkyl radicals are preferred $R^1$ substituents in the quaternary ammonium compounds according to the invention. Particularly preferred substituents which $R^1$ in general formula (I) may represent are the methyl hydroxyethyl and 2-hydroxypropyl radicals.

Suitable $R^2$ substituents in general formula (I) of the quaternary ammonium compounds according to the invention include $C_1$-$C_4$ alkyl radicals or $C_1$-$C_4$ hydroxyalkyl radicals, i.e. to this extent the same groups as mentioned above in respect of the substituent $R^1$. Of these groups, the $C_1$-$C_4$ alkyl radicals are preferred $R^2$ substituents. The particularly preferred $R^2$ substituent on the ammonium nitrogen of the compounds according to the invention corresponding to general formula (I) is the methyl radical. In addition, however, the $R^2$ substituent may also be a 2-hydroxyethyl radical and a phenalkyl radical containing from 1 to 3 carbon atoms in the alkyl group. Suitable phenalkyl radicals of this type are, for example, the benzyl radical, the phenylethyl radical or the phenylpropyl radical.

In the quaternary ammonium compounds according to the invention corresponding to general formula (I), the substituents $R^3$ and $R^4$ may be the same or different. Preferred quaternary ammonium compounds are those in which the substituents $R^3$ and $R^4$ are the same. According to the invention, the substituents $R^3$ and $R^4$ are a radical corresponding to the following general formula

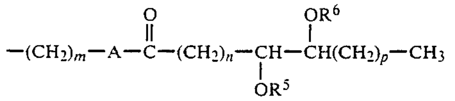
(II)

In the radical corresponding to general formula (II), m is an integer of from 1 to 3; accordingly, a methylene, ethylene or propylene group is directly attached to the ammonium nitrogen atom. Attached thereto is a group —A— which may represent an —O— bridge or an —NH— bridge, depending on whether an ester bond or an amide bond establishes the bond between the original amine and the original hydroxyether carboxylic acid in the quaternary ammonium compounds according to the invention.

In general formula (II), n and p independently of one another are integers of from 1 to 12, the sum (n+p) being an integer of from 2 to 20. This derives from the fact that unsaturated natural fatty acids or natural fatty acids bridged by an oxygen bridge (after epoxidation), which according to the invention should contain no more than 24 carbon atoms, the position of the olefinic double bond or the subsequent epoxide group lying centrally in the molecule, normally at the carbon atoms 9/10 or 13/14, depending on the natural source of the particular fatty acids, are used as natural source of the particular fatty acids, are used as natural educts in the production of the quaternary ammonium compounds corresponding to general formula (I). The values for n and p are normally integers of from 1 to 7, giving a sum (n+p) of from 2 to 14.

In the radical corresponding to general formula (II), $R^5$ and $R^6$ may be hydrogen or a saturated or unsaturated $C_1$–$C_{22}$ alkyl radical, with the proviso that $R^5$ is hydrogen when $R^6$ is an alkyl radical containing a number of carbon atoms in the above-mentioned range and vice versa. This derives from the fact that the alcohol-induced reaction of the opening of the epoxide ring may take place both in one direction and in the other, i.e. the hydrogen atom of the alcohol used for the ring opening may be added to the oxygen atom of the carbon atoms situated nearer the carbonyl group while the alkoxy group of the alcohol is added to the carbon atom situated further from the carbonyl group, and vice versa. On account of the fairly long distance of the oxirane ring from other functional groups by several methylene groups, the ring opening reaction cannot be specifically controlled, so that mixtures of compounds of both types are generally formed.

The alkyl or alkenyl radical represented by $R^5$ and $R^6$ in general formula (II) above is a $C_1$–$C_{22}$ radical. Accordingly, suitable alkyl radicals include the methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, behenyl radicals or corresponding unsaturated aliphatic radicals and also the branched isomers of the alkyl or alkenyl radicals mentioned. According to the invention, preferred radicals $R^5$ and $R^6$ are straight-chain alkyl or alkenyl radicals. This derives from the fact that alcohols emanating from natural sources, more especially fatty alcohols, of which the alkyl or alkenyl radicals are generally straight-chained, are used as alcohols for the ring opening reaction of the epoxides. $C_{12}$–$C_{18}$ alkenyl radicals $R^5$ and $R^6$ (among which the $C_{18}$ radical in particular may even be mono- or polyunsaturated) are particularly preferred, because they may be inexpensively produced in large quantities from natural fats or oils by industrial processes. It is also possible to use fatty alcohol mixture of the type obtained in the hydrogenation of natural fats or oils. In mixtures such as these, the number of carbon atoms in the alkyl chain is distributed over a more or less wide range determinable, for example, by distillation or the like, so that mixtures of which the different alkyl radicals reappear in the product, i.e. in the radicals $R^5$ and $R^6$, are used for the ring opening. Such mixtures represented by $R^5$ and $R^6$ inlcude, for example, tallow alkyl, cocosalkyl or soya alkyl radicals which may be both completely saturated and also, commensurate with their natural composition, partially unsaturated.

The quaternary ammonium compounds according to the invention corresponding to general formula (I) are produced by a process of which some of the individual steps are known from the literature. More particularly, the production of the quaternary ammonium compounds (I) takes the following course: epoxy fatty acid esters corresponding to the following general formula

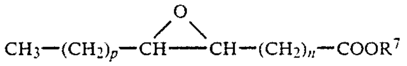
(III)

in which $R^7$ is a $C_1$–$C_6$ alkyl radical and n and p are as defined above, are reacted in known manner with an alcohol corresponding to the following general formula $R^5$—OH (IV)

in which $R^5$ is a saturated or unsaturated $C_1$–$C_{22}$ alkyl radical.

Accordingly, unsaturated fatty acids of the type which can be inexpensively obtained on an industrial scale, for example in the transesterification of animal and/or vegetable fats or oils, are epoxidized by known methods, for example with $H_2O_2$ or peroxycarboxylic acid, and the individual compounds or carboxylic acid mixtures obtained are reacted, as described, with an alcohol corresponding to general formula (IV). The ester group of the epoxy fatty acid ester used corresponding to general formula (III) may be a methyl, ethyl, propyl, butyl, pentyl or hexyl group, the subsituent $R^7$ comprising both the straight-chain alkyl radicals and also the branched isomers. In the fatty acid part, the starting epoxyfatty acids esters contain a number of carbon atoms which corresponds to the number of the fatty acids occurring in derivatized form in natural fats or oils. $C_{12}$–$C_{24}$ fatty acids from the natural sources mentioned above are preferably used, although it is also possible in principle to use fatty acids containing a far smaller number or even a larger number of carbon atoms. In general, the natural mixtures of fatty acids containing different numbers of carbon atoms or with different positions of the olefinic double bond or (after epoxidation) the oxirane ring are used in the process according to the invention for the production of quaternary ammonium compounds corresponding to general formula (I); processes for the production of mixtures such as these from natural sources are known from the prior art and are not the subject of the present invention.

The alcohols used for the opening of the oxirane ring correspond to general formula (IV), in which $R^5$ is a saturated or unsaturated $C_1$–$C_{22}$ alkyl radical. The alcohols in question may be linear or branched; it is also possible to use mixtures of alcohols of the type which accumulate inexpensively in large quantities after the optionally partial hydrogenation of natural fats and/or oils on an industrial scale. Accordingly, it is possible to use individual compounds or mixtures of linear or branched alcohols from the group comprising methanol, ethanol, propanol, butanol, pentanol, hexanol, heptanol, octanol, nonanol, decanol, undecanol, dodecanol, tridecanol, tetradecanol, pentadecanol, hexadecanol, heptadecanol and octadecanol or where available, the corresponding unsaturated homologs, among which oleyl alcohol, linoleyl alcohol and linolenyl alcohol are particularly suitable.

The ring opening reaction of the epoxyfatty acid esters corresponding to general formula (III) with the alcohol corresponding to general formula (IV) results in the formation of hydroxyether carboxylic acid esters in accordance with the following reaction equation (1)

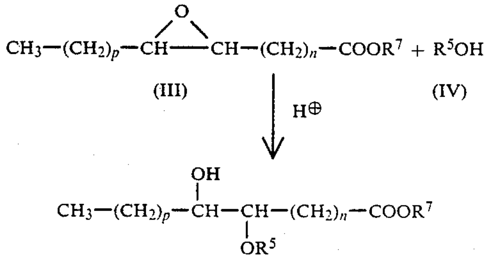

The opening reaction of the oxirane ring takes place in known manner, for example in the presence of a mineral acid or carboxylic acid as catalyst.

The hdyroxyether carboxylic acid esters formed in the course of this ring opening reaction are saponified in a subsequent saponification reaction to form free hydroxyether carboxylic acids in accordance with reaction equation (2) below. This saponification reaction is also carried out by methods known from the prior art and may make use of the catalytic effect of an acid or base:

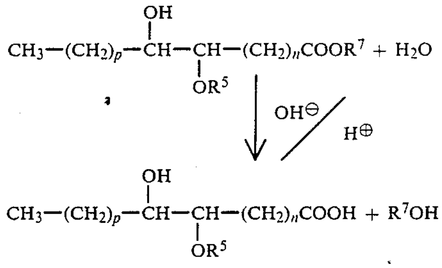

In the next step of the process according to the invention for the production of quaternary ammonium compounds corresponding to general formula (I), the hydroxyether carboxylic acids obtained in accordance with equation (2) are reacted with an amine corresponding to the following general formula

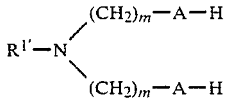

(V)

The reaction takes place in accordance with equation (3) below:

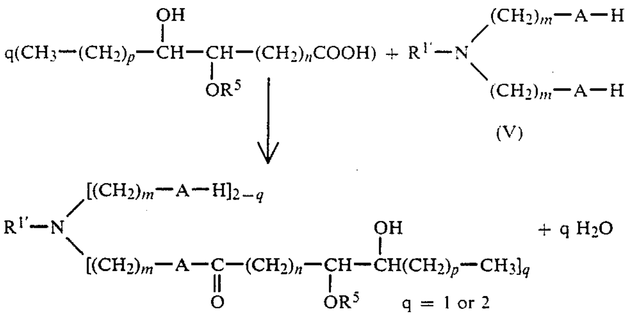

In the course of this reaction, therefore, the free carboxyl group of the hydroxyether carboxylic acids is amidated with the terminal amino groups of the amine (V) (A=—NH—) or esterified with the terminal hydroxy groups of the amine (V) (A=—O—). The esterification or amidation reaction may be carried out by reacting each of the two terminal amino or hydroxyl groups of the amine (V) with one molecule of the hydroxyether carboxylic acid. In this case, the stoichiometric factor q before the hydroxyether carboxylic acid in reaction equation (3) is equal to 2. The molar ratio of hydroxyether carboxylic acid to amine (V) in this case is from 3.5:1 to 2:1. This form of the amidation or esterification reaction gives amides or esters in which the two substituents attached to the aminonitrogen by an alkylene group are identical.

It is also possible, however, to adjust the molar ratio of hydroxyether carboxylic acid to amine (V) to a value of approximately 1:1. In this case, only one of the terminal amino groups or a hydroxyl group of the amine (V) is amidated or esterified. In this case, the stoichiometric factor q before the hydroxyether carboxylic acid in reaction equation (3) is equal to 1. Amines in which only one of the terminal amino groups is amidated or only one of the terminal hydroxyl groups esterified are formed in the course of this reaction.

The reaction is preferably carried out in accordance with equation (3), in which the molar ratio of hydroxyether carboxylic acids to amine (V) is from 2:1 to 2.5:1, so that products are formed in which both terminal amino groups are amidated or both terminal hydroxyl groups esterified.

Amines (V), in which the substituent $R^1$, is hydrogen or a radical corresponding to the above-defined meaning for $R^1$, may be used in the reaction according to equation (3). In addition to hydrogen, therefore, $R^{1'}$ may represent $C_1$–$C_4$ alkyl radicals or $C_1$–$C_4$ hydroxyalkyl radicals. In cases where amines (V), in which $R^{1'}$ represents hydrogen, are used, the secondary amine obtained in accordance with reaction equation (3) is alkoxylated with ethylene oxide or propylene oxide in an approximate molar ratio of 1:1. This results in the formation of tertiary amines which contain an ethoxy or propoxy group instead of the hydrogen atom.

Instead of first saponifying the hydroxyether carboxylic acid esters obtained in accordance with equation (1) in accordance with equation (2) and reacting the corresponding hydroxyether carboxylic acid thus formed with the amine (V), it is also possible directly to react the hydroxyether carboxylic acid ester with the amine (V) in accordance with equation (3*a*) below, so that in suitable cases the saponification step according to equation (2) may be advantageously be saved.

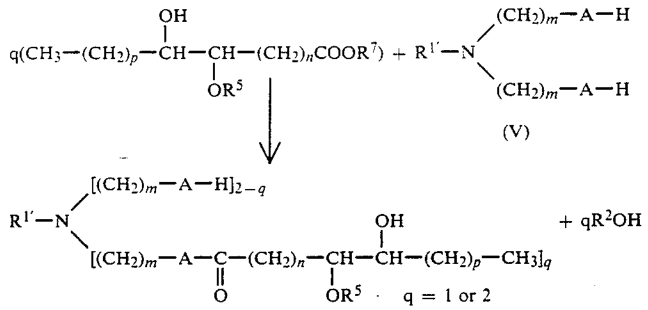

(V)

q = 1 or 2

The amidation or esterification reaction, irrespective of whether the unsaponified carboxylic acid ester (product of equation (1)) or the carboxylic acid formed after saponification in accordance with equation (2) is used as starting material, is carried out by methods known per se from the prior art, for example at elevated temperature; the temperatures are normally in the range of from 180° to 220° C. and preferably at 200° C. A water separator is normally used in order directly to remove the water of reaction or the alcohol formed during the reaction from the educt/product mixture and hence to displace the equilibrium of the reaction towards the products. However, it is also possible to use a solvent which forms an azeotrope with water or the alcohol and by means of which the water of reaction formed or the alcohol is "dragged out" from the reaction mixture. The reaction is normally carried out in an inert gas atmosphere.

The amines used from the large number of compounds encompassed by general formula (V) are advantageously methyldiethanolamine ($R^{1'}$=methyl, m=2, A=—O—), triethanolamine ($R^{1'}$=hydroxyethyl, m=2, A=—O—), methyldipropylenetriamine ($R^{1'}$=methyl, m=3, A=—NH—) and dipropylenetriamine ($R^{1'}$=H, m=3, A=—NH—). In the case of the last of these compounds, i.e. where amidation is carried out with dipropylenetriamine, the hydroxyether carboxylic acid amide obtained is normally ethoxylated or propoxylated by reaction with ethylene oxide or propylene oxide in a molar ratio of 1:1, so that tertiary amines containing an ethoxy or propoxy group as the substituent $R^1$ are subsequently formed.

In a following reaction step, the compounds thus obtained are reacted in known manner with a quaternizing agent corresponding to the following general formula (VI)

$$R^2X \qquad (VI)$$

in which $R^2$ and X are as defined above. Accordingly, suitable quaternizing reagents (VI) are those in which $R^2$ may be a $C_1$–$C_4$ alkyl radical, a $C_1$–$C_4$ hydroxylalkyl radical or a phenalkyl radical containing from 1 to 3 carbon atoms in the alkyl group. According to the invention, X is the anion of an inorganic acid. Accordingly, suitable substituents $R^1$ are, in particular, the methyl, ethyl, propyl, butyl, hydroxyethyl, hydroxypropyl, hydroxybutyl and benzyl, phenylethyl or phenylpropyl groups; the alkyl radicals mentioned may be both straight-chained and also branched. For the reasons explained above, preferred quaternizing reagents for the quaternization reaction are those in which $R^2$ is a $C_1$–$C_4$ alkyl radical. Preferred alkylating reagents (VI) use the methyl group as the quaternizing group (II). The quaternizing reagents are derived from inorganic or organic acids. Accordingly, $X^{\ominus}$ is the anion of an inorganic or organic acid. Examples of such include chloride, methosulfate, formate, acetate, propionate, etc. Preferred quaternizing reagents contain the chloride ion or the acetate ion as the group $X^{\ominus}$, the chloride ion being particularly preferred. Accordingly, suitable quaternizing reagents for practical application include methyl chloride, benzyl chloride, dimethyl sulfate or acetic acid, of which methyl chloride may generally be used with advantage. Where acetic acid is used as the quaternizing agent, the aminonitrogen would only be protonated; in this case, the quaternization is carried out in the presence of ethylene oxide or propylene oxide, so that the fourth group at the ammonium nitrogen atom is also an organic group, in this case a hydroxyethyl or R-hydroxypropyl group.

The quaternization reaction, which takes place in accordance with equation (4) below, is carried out by methods known per se.

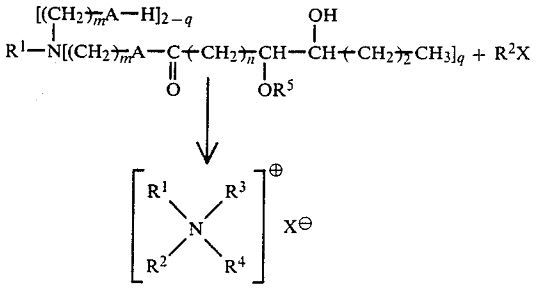

(I)

(with $R^3 = (CH_2)_m-A-H$ and $R^4 =$ (II) or $R^3 = R^4 =$ (II)) ($q = 1$ or 2)

This means, for example, that the reaction is carried out in a solvent in which both the starting materials and also the products are soluble to the extent necessary for the reaction. Solvents of this type known from the prior art include polar organic solvents, such as for example $C_1$–$C_6$ alcohols, among which isopropanol is preferably used. However, the reaction may also be carried out in a mixture of such an organic polar solvent with water. For example, it can be of advantage to carry out the quaternization reaction in a mixture of alcohol and water. This mixture, is which the alcohol is preferably isopropanol, has a composition by volume of from 2 to 5 parts by volume alcohol to 1 part by volume water.

The reaction is normally carried out at elevated temperature and pressure, for example in an autoclave. The reaction may be carried out at a temperature of from 50° to 150° C., but is preferably carried out at a temperature of 100° C. The pressures in the autoclave are normally in the range of from 1.5 to 6 bar. However, it is also possible, as in the prior art, to carry out the reaction in the absence of a solvent. The particular reaction conditions to be adjusted are determined primarily by the "quaternization capacity" of the quaternizing reagent. Where methyl chloride is used, moderate reaction conditions for example may be sufficient, so that there may be even be no need for the presence of a solvent.

Now, the quaternary ammonium compounds corresponding to general formula (I) obtained in accordance with reaction equations (1) to (4) may, if desired, be isolated from the reaction solution by methods known per se in a final process step. This may be done, for example, by precipitation and subsequent filtration, recrystallization, distillation or by other methods known per se to the expert. However, the more or less concentrated solutions obtained in the course of the quaternization reaction may also be directly used in accordance with the invention.

The quaternary ammonium compounds of general formula (I) according to the invention are liquid to pasty substances which may readily be dissolved or dispersed in water or water/alcohol mixtures, the viscosity of the solutions or dispersions generally being lower than that of the quaternization products (I) themselves. The compounds obtained show outstanding stability to hydrolysis and may be excellently processed into fabric aftertreatment concentrates or directly used as fabric aftertreatment preparations. The concentrates show excellent stability in storage and behave in exactly the same way as freshly prepared concentrates even after extreme variations in temperature (freezing and subsequent thawing or high-temperature treatment).

The present invention also relates to the process of using the quaternary ammonium compounds corresponding to general formula (I) as fabric aftertreatment preparations for synthetic and natural fibers and materials made therefrom. The new compounds corresponding to general formula (I) prepared by the process according to the invention may be used for example as fabric softeners which may be used both in the rinse cycle and also during washing or during drying in automatic dryers. It has been found that, where the compounds corresponding to general formula (I) are used in accordance with the invention, the preparation does not accumulate on the fibers, so that the absorbency of the fibers is not permanently affected. On the contrary, the fibers treated with the quaternary ammonium compounds corresponding to general formula (I) according to the invention show distinctly better absorbency than fibers treated with very good state-of-the-art fabric softening compounds. The fabric aftertreatment preparations which may be prepared using the compounds of general formula (I) according to the invention have, for example, the following composition:

2 to 80% by weight ammonium compounds of general formula (I) according to the invention;
20 to 90% by weight carriers, solvents and/or diluents;
0 to 20% by weight emulsifier;
0 to 3% by weight preservative;
0 to 5% by weight perfumes;
0 to 1% by weight dyes; and
balance to 100% by weight: viscosity regulators, opacifiers, optionally acidic compounds and other additives.

Even when the compounds of general formula (I) according to the invention are added to detergents of corresponding composition containing at least one washing-active compound, they are capable of developing a softening effect. Detergents such as these are preferably based on formulations containing nonionic surfactants. If the process products are applied to sheet-form textiles as carriers, optionally together with standard auxiliaries and additives, they may also be used as tumbler aids.

The invention is illustrated by the following Examples.

EXAMPLE I (a) Ring opening of epoxystearic acid methyl ester ((III); ($R^7=CH_3$, $n=p=7$) with tallow alcohol ((IV); $R^5=C_{16}$–$C_{12}$ alkyl radical):

575.1 g (1.7 moles) of 9,10-epoxystearic acid methyl ester (epoxide number 4.73, molecular weight calculated therefrom: 338.3) and 132.7 g (5.1 moles) tallow alcohol (OH number 215.6, molecular weight calculated therefrom: 260.2) were heated until a homogeneous liquid had formed. Concentrated sulfuric acid (2.9 g, corresponding to 1.7 g/mole epoxide) was then added with stirring under nitrogen and the reaction mixture heated to 100° C. A mildly exothermic reaction began at 90° C. After 3 hours at 100° C., the epoxide number had fallen to 0.23 and, after 4 hours, to 0.03. The reaction was then terminated by neutralization of the sulfuric acid catalyst with a stoichiometric quantity (10.4 g) of 30% sodium methylate solution and the excess tallow alcohol distilled off together with secondary constituents from the stearic acid methyl ester derivative. The yield was about 917.1 g. Characteristic data of the ring opening product: acid number 0.2; saponification number 93.5; OH number 82.5; Distillate (excess tallow alcohol): 959 g.

(b) Preparation of the free acid:

892 g (1.49 moles) of epoxystearic acid methyl ester ring-opened in accordance with step (a) (molecular weight: 600.0, calculated from the saponification number of 93.5) were saponified for 4 hours at 85° C. with 66 g (1.65 moles), i.e. an excess of 10%, of caustic soda in 2254 g of water and 400 ml of isopropanol. The reaction mixture was worked up by acidification with 35% sulfuric acid to a pH value of from 2 to 3, separation of the upper layer, washing of the upper phase twice with 1.5 liters of water and drying in a water jet vacuum at a liquid temperature of up to 110° C. The yield of the free hydroxyether carboxylic acid was about 780 g; Characteristic data: acid number 87.4; saponification number 96.2; OH number 113.

(c) Preparation of the aminodiamide:

256.7 g (0.4 mole) of the free hydroxyether carboxylic acid prepared in accordance with step (b) (molecular weight 641.8, calculated from the acid number of 87.4) and 26.2 g (0.2 mole) of dipropylenetriamine (DPTA) were heated for 5 hours to 200° C. in a 0.5 liter stirring apparatus equipped with a water separator, nitrogen inlet and contact thermometer, 6.6 g (calculated: 7.2 g) of water distillate accumulated in that time. The yield amounted to 272.0 g. Characteristic data: acid number 3.1; amine number 34.6.

(d) Alkylation with ethylene oxide:

264.2 g (0.163 mole) of the aminodiamide obtained in accordance with step (c) were reacted with 7.2 g (0.163 mole) of ethylene oxide for 5.5 hours at 85° C./3.5 bar pressure. The yield was about 269.5 g. Amine number; 32.7.

(e) Quaternization with methyl chloride:

267.6 g (0.156 mole) of the alkoxylation product obtained in accordance with step (d) (molecular weight 1715.8, calculated from the amine number) were reacted in an autoclave with methyl chloride at 100° C./5 bar pressure in the presence of 69.9 g of isopropanol and 22 g of water as solvent mixture. The amine number was continuously monitored from samples taken at hourly intervals. After 3 hours, it had fallen from 56.6 to 5.4 (based on 100% product). The yield comprised 330.3 g of the quaternary ammonium salt (I) ($R^1$=hydroxyethyl, $R^2$=methyl, $R^3$=$R^4$=(II) with m=3, A=—NH—, n=p=7, $R^5$=H, $R^6$=tallow alkyl). The product accumulated in the form of a 75% solution and had an acid number of 5.4.

EXAMPLE II (a) Preparation of an aminodiamide:

287.2 g (0.513 mole) of epoxidized erucic acid ring-opened with dodecanol (molecular weight: 550, calculated from the acid number of 102) and 37.2 g (0.256 mole) of methyl dipropylenetriamine were heated under nitrogen for 5 hours to 200° C. The acid number fell to 3.6 during that time. 10.9 g of distillate had collected in the water separator. The yield was about 302.4 g; amine number; 46.4.

(b) Quaternization with methyl chloride:

In a stirrer-equipped autoclave, 290.2 g (0.24 mole) of the product obtained in accordance with step (a) (molecular weight: 1209, calculated from the amine number) were treated with methyl chloride in the absence of a solvent at 89°-91° C./5-6 bar pressure. After 2 hours, the amine number had fallen from 46.4 to 2.1. The yield was about 275 g of a 100% product.

EXAMPLE III (a) Preparation of a triethanolamine ester:

339.0 g (0.55 mole) of epoxystearic acid ring opened with tallow alcohol (molecular weight 616.4, calculated from the acid number of 91.02) and 82.1 g (0.55 mole) of triethanolamine (TEA) were heated for 5.5 hours to 200° C. in a 0.5 liter stirring apparatus equipped with a water separator and nitrogen inlet. 9.4 g of water distillate had accumulated in that time, the acid number having fallen to 2.0.

The amine number (determined with perchloric acid in glacial acetic acid) was 73.0, from which the average molecular weight of the ester product was calculated as 768.6. The yield was 407.4 g.

(b) Quaternization with methyl chloride:

After addition of 51.9 g of isopropanol and 16.4 g of water, 192.1 g (0.25 mole) of the product obtained in accordance with step (a) were reacted with methyl chloride at 90°-100° C/5-6 bar pressure. After 7 hours, the amine number had fallen from 73.0 to 3.8. The yellow solution formed has a content of 75% of the compound corresponding to general formula (I) ($R^1$=hydroxyethyl, $R^2$=methyl, $R^3$=hydroxyethyl and $R^4$=II with m=2, A=—O—, n=p=7, $R^5$=H, $R^6$=tallow alkyl and X=Cl).

EXAMPLE IV (a) Preparation of the free hydroxyether carboxylic acid:

Ethoxystearic acid methyl ester was ring opened with tallow alcohol in accordance with process steps (a) and (b) of Example I, after which the free acid was prepared from the product formed by alkaline saponification. The hydroxyether carboxylic acid obtained in this way had the following characteristic data: acid number; 84.3, from which a molecular weight of 665.5 was calculated; saponification number; 85.6, OH number; 125.8.

(b) Esterification to the triethanolamine ester:

The hydroxyether carboxylic acid obtained in accordance with step (a) of the present Example was esterified with triethanolamine in a molar ratio of 1:1 in accordance with Example III, step (a). The triethanolamine monoester formed therefrom had the following characteristic data: Amine number; 68.8, from which a molecular weight of 815.4 was calculated; Acid number; 0.97, OH number; 233.

(c) Quaternization with ethylene oxide in the presence of acetic acid:

15.0 g (0.25 mole) of acetic acid and 57.5 g of water were added to 203.9 g (0.25 mole) of the product obtained in accordance with step (b). After purging with nitrogen, the mixture was heated to 80° C. in an autoclave and treated with 16.5 g (0.37 mole) of ethylene oxide. During the reaction time of 3.5 hours the pressure fell from 3.0 to 2.5 bar. The acid number fell to 5.0. After venting of the autoclave, the product was removed while still hot. After cooling, phase separation occurred. Before the quaternary ammonium compound corresponding to general formula (I) ($R^1$=$R^2$=$R^3$=hydroxyethyl, $R^4$=II with m=2, A=—O—, n=p=7, $R^5$=H, $R^6$=tallow alkyl) obtained in this way was used, the product (characteristic data: amine number 47.2; acid number; 11.6) was throughly dispersed in water.

EXAMPLE V

Further quaternary ammonium compounds corresponding to general formula (I) were prepared in accordance with the procedure described in Examples I to III. The compounds prepared and their characteristic data are shown in Table 1 below:

TABLE 1

Further compounds corresponding to general formula (I); $R^2 = CH_3$, $R^3 = R^4 =$ II (see page 4).

| Compound no. | $R^1$ | m | A | n | p | $R^5/R^6$ | Amine number | Amine number[1] | Acid number[2] |
|---|---|---|---|---|---|---|---|---|---|
| 5a | $CH_3$ | 3 | NH | 7 | 7 | $H/C_{18}$[4] | 3.26 | (34.6) | |
| 5b | $CH_2CH_2OH$ | 3 | NH | 7 | 7 | $H/C_{18}$[4] | 3.7 | (45.1) | |
| 5c | $CH_2CH_2OH$ | 3 | NH | 11 | 7 | $H/C_{12}$ | 3.5 | (36.5) | |
| 5d | $CH_3$ | 2 | O | 11 | 7 | $H/C_{12}$ | 3.1 | (47.3) | |
| 5e | $CH_3$ | 3 | NH | 7 | 7 | $H/C_{16/18}$ | 1.5 | (41.6) | 6.7[2] |
| 5f | $CH_3$ | 3 | NH | 7 | 7 | $H/C_{12/18}$ | 0.5 | (55.4) | 6.1[2] |
| 5g | $CH_3$ | 3 | NH | 7 | 7 | $H/C_{16/18}$ | 0.9 | (51.5) | 5.8[2] |
| 5h | $CH_2CH_2OH$ | 2 | O | 7 | 7 | $H/C_{16/18}$ | 0.0 | (40.0) | 11.5[2] |
| 5i | $CH_2CH_2OH$ | 3 | NH | 7 | 7 | $H/C_{16/18}$ | 2.4 | [3] | |

Explanations:
[1] in brackets: amine numbers of the non-quaternized intermediate stages
[2] acid numbers
[3] titration by Barr's method: 27.2 mvdl/100 g
[4] monounsaturated

EXAMPLE VI

The products of Examples I to V were dispersed in a concentration of 0.3 g/1 water. Cotton terry which had been treated for 96 hours with a solution of sodium tripolyphosphate (4 g/1 water) was calculated for 5 minutes with the dispersions, after which the treatment liquor was separated off by centrifuging for 10 seconds. After drying, the terry samples were tested for their softness (feel marks) by comparison with the hard starting material (untreated or variously pretreated samples) by six examiners experienced in assessing the softness of fabrics. The examinations were conducted on two pieces of fabric which had been pretreated in the same way with active substance (double determination). All the terry samples which had been treated with the quaternary ammonium salts according to the invention were judged as soft with a pleasant, full feel.

A molleton fabric which has been pretreated in the same way for 120 hours and was therefore very hard was assessed as favorably as the terry samples after treatment with the same dispersions.

A prewashed terry cloth was penetrated in the same way by prewashing 5 times in the usual way and was then impregnated for 5 minutes with the aftertreatment preparation to be tested in exactly the same way as the cloth "hardened" with sodium tripolyphosphate. In the feel test, the feel was again judged to be soft, pleasant and full. In every case, the treated fabrics showed excellent absorbency after drying.

The results of the feel test are shown in detail in Table 2 below in which the scale of feel marks extends from 0 = very hard to 6 = very soft.

TABLE 2

Results of the feel test on fabrics (terry, molleton) aftertreated with compounds corresponding to formula (I) (in-use concentration: 0.3 g/l in water)

| Compound no. | Feelmarks: hardened terry | hardened molleton | prewashed terry | ϕ-value |
|---|---|---|---|---|
| 1 | 4.4 | 3.6 | 4.7 | 4.2 |
| 2 | 4.6 | 4.8 | 4.9 | 4.7 |
| 3 | 4.7 | 5.0 | 4.8 | 4.8 |
| 4 | 2.5 | 2.2 | 2.2 | 2.3 |
| 5a | 2.9 | 3.5 | 5.1 | 3.8 |
| 5b | 4.2 | 4.6 | 4.7 | 4.5 |
| 5c | 4.8 | 4.8 | 4.3 | 4.6 |
| 5d | 4.4 | 4.4 | 5.0 | 4.6 |
| 5e | 3.5 | 4.0 | 5.2 | 4.2 |
| 5f | 4.1 | 4.0 | 4.7 | 4.2 |
| 5g | 3.3 | 5.0 | 4.4 | 4.2 |
| 5h | 4.7 | 4.9 | 4.8 | 4.8 |
| 5i | 4.8 | 4.5 | 4.2 | 4.5 |

We claim:

1. Quaternary ammonium compound corresponding to the following formula

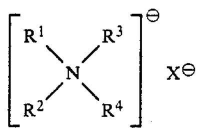

(I)

wherein $R^1$ is a $C_1$–$C_4$ alkyl radical or a $C_1$–$C_4$ hydroxyalkyl radical, $R^2$ is a $C_1$–$C_4$ alkyl radical, a $C_1$–$C_4$ hydroxyalkyl radical or a phenalkyl radical containing from 1 to 3 carbon atoms in the alkyl group, and $R^3$ and $R^4$ may be the same or different and represent a radical corresponding to the following formula

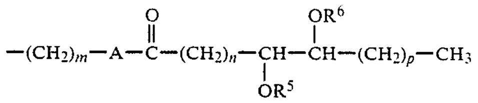

(II)

in which m is an integer of from 1 to 3, n and p independently of one another is an integer of from 1 to 12 with a sum (p+n) of from 2 to 20, A is a group —O— or —NH—, and $R^5$ and $R^6$ are hydrogen or a $C_1$–$C_{22}$ alkyl radical, with the proviso that $R^5$ is H when $R^6$ is an alkyl radical and vice versa, and $X^\ominus$ is the anion of an inorganic or organic acid.

2. A quaternary ammonium compound as in claim 1 wherein in formula (I), $R^1$ is a $C_1$–$C_4$ hydroxyalkyl radical.

3. A quaternary ammonium compound as in claim 2 wherein in formula (I), $R^1$ is a hydroxyethyl radical or hydroxypropyl radical.

4. A quaternary ammonium compound as in claim 1 wherein in formula (I), $R^2$ is a $C_1$–$C_4$ alkyl radical.

5. A quaternary ammonium compound as in claim 4 wherein in formula (I), $R^2$ is a methyl radical.

6. A quaternary ammonium compound as in claim 1 wherein the radicals $R^3$ and $R^4$ are the same.

7. A quaternary ammonium compound as in claim 1 wherein in formula (II), $R^5$ or $R^6$ is a straight-chain, $C_{12}$–$C_{18}$ alkyl radical.

8. A quaternary ammonium compound as in claim 7 wherein in formula (II), $R^5$ or $R^6$ represents a mixture of straight-chain, alkyl radicals containing from 12 to 18 carbon atoms.

9. A quaternary ammonium compound as in claim 8 wherein in formula (II), $R^5$ or $R^6$ represents a tallow alkyl, cocosalkyl, or soya alkyl radical.

10. A quaternary ammonium compound as in claim 1 wherein in formula (I), $X^\ominus$ is an anion selected from chloride, methosulfate, formate and acetate.

11. A quaternary ammonium compound as in claim 10 wherein in formula (I), $X^\ominus$ represents chloride and acetate.

* * * * *